(12) United States Patent
Sharma et al.

(10) Patent No.: US 12,165,083 B2
(45) Date of Patent: Dec. 10, 2024

(54) METHOD AND SYSTEM FOR RECOMMENDING TOOL CONFIGURATIONS IN MACHINING

(71) Applicant: Tata Consultancy Services Limited, Mumbai (IN)

(72) Inventors: Sunil Sharma, Pune (IN); Bilal Muhammed, Pune (IN); Srimannarayana Pusuluri, Pune (IN); Purushottham Gautham Basavarsu, Pune (IN); Prasenjit Das, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 941 days.

(21) Appl. No.: 17/111,097

(22) Filed: Dec. 3, 2020

(65) Prior Publication Data

US 2021/0216896 A1  Jul. 15, 2021

(30) Foreign Application Priority Data

Dec. 4, 2019  (IN) .............................. 201921050010

(51) Int. Cl.
   *G06N 20/00*      (2019.01)
   *G06N 3/047*      (2023.01)
   *G06N 3/08*       (2023.01)
   *G06N 7/01*       (2023.01)

(52) U.S. Cl.
   CPC .............. *G06N 7/01* (2023.01); *G06N 20/00* (2019.01); *G06N 3/047* (2023.01); *G06N 3/08* (2013.01)

(58) Field of Classification Search
   CPC ........ G06N 20/00; G06N 20/10; G06N 20/20; G06N 7/00; G06N 7/01; G06N 7/02; G06N 7/04; G06N 5/00; G06N 5/02; G06N 5/022; G06N 5/04; G06N 7/005; G06N 3/08;
   (Continued)

(56) References Cited

PUBLICATIONS

Kabaldin et al. "Modular Design of Machine-Tool Equipment as Cyberphysical Systems on the Basis of Artificial Intelligence and Cloud Technology for Digital Production" Jun. 2019 https://link.springer.com/article/10.3103/s1068798x19040099 (Year: 2019).*

(Continued)

*Primary Examiner* — Randall K. Baldwin
(74) *Attorney, Agent, or Firm* — FINNEGAN, HENDERSON, FARABOW, GARRETT & DUNNER LLP

(57) ABSTRACT

This disclosure relates generally to recommending tool configurations in machining. The machining tool configuration selection involves the selection of several tool specification parameters concerning the material, geometry and composition of the machining tool. The state-of-the-art methods uses a rule and knowledge-based system to select tool configuration, however these methods do not recommend tool configurations which satisfy customer requirement. Embodiments of the present disclosure uses a hierarchical model which is trained to predict acceptable tool specification parameters for a given requirement by learning the patterns from past tool selection data. Further a probabilistic approach is used to predict the top set of recommendations of tool configurations with a probability score for each prediction. The disclosed method is used for recommending tool configurations in a cylindrical grinding wheel process.

11 Claims, 4 Drawing Sheets

(58) Field of Classification Search
CPC .................. G06N 3/047; G06B 19/404; G06B 2219/35327; G06B 2219/37518
See application file for complete search history.

(56) References Cited

PUBLICATIONS

Wang et al. "A tree-based decision method for the configuration design of reconfigurable machine tools" Oct. 2018 https://www.sciencedirect.com/science/article/pii/S0278612518302024 (Year: 2018).*

Zhou et al. "Deep learning enabled cutting tool selection for special-shaped machining features of complex products" Apr. 2019 https://www.sciencedirect.com/science/article/pii/S0965997819300225 (Year: 2019).*

Shao et al. "Generative adversarial networks for data augmentation in machine fault diagnosis" Jan. 2019 https://www.sciencedirect.com/science/article/pii/S0166361518305657 (Year: 2019).*

Ware et al. "Interactive machine learning: letting users build classifiers" May 2002 https://www.sciencedirect.com/science/article/pii/S1071581901904999 (Year: 2002).*

Bu et al. "Coordinated Self-Configuration of Virtual Machines and Appliances Using a Model-Free Learning Approach" 2013 https://ieeexplore.ieee.org/stamp/stamp.jsp?tp=&arnumber=6216363 (Year: 2013).*

Wang, Lihui, and Fengfeng Xi, eds. Smart devices and machines for advanced manufacturing. Springer Science & Business Media, 2008. (Year: 2008).*

Dinh, Hoai-Nam, Shang-Liang Chen, and Cheng-Ru Yu. "Development of intelligent machining knowledge database for manufacturing cloud system of machine tool." 2016 7th International Conference on Mechanical and Aerospace Engineering (ICMAE). IEEE, 2016. (Year: 2016).*

Shelar, Pankaj R. et al., "Selecting Appropriate Cutting Tool Insert for Turning Using Analytical Hierarchy Process and Weighted Product Method", International Journal of Mechanical and Production Engineering, May 2016, vol. 4, Issue-5, ISSN, http://www.iraj.in/journal/journal_file/journal_pdf/2-257-14653643151-4.pdf.

Li, Pin et al., "A Deep Learning Based Method for Cutting Parameter Optimization for Band Saw Machine", Annual Conference of the Prognostics and Health Management Society, Sep. 2019, Semantic Scholar, file:///C:/Users/154494/Downloads/769-DocumentUpload-3299-1-10-201909221.pdf.

Wang, Chen et al., "Modularized Cutting Tool Selection Expert System", The Open Mechanical Engineering Journal, Dec. 2014, vol. 8 (1), pp. 892-898, Semantic Scholar, https://www.researchgate.net/publication/289729351_Modularized_Cutting_Tool_Selection_Expert_System/link/592e643045851553b6558a85/download.

Jaider, Oussama et al., "An Automatic Feature-based Cutting Tool Selection Approach for Turning Process", International Journal of Current Engineering and Technology, 2015, vol. 5, Semantic Scholar, https://inpressco.com/wp-content/uploads/2015/09/Paper193193-32101.pdf.

* cited by examiner

METHOD AND SYSTEM FOR RECOMMENDING TOOL CONFIGURATIONS IN MACHINING

PRIORITY CLAIM

This U.S. patent application claims priority under 35 U.S.C. § 119 to Indian provisional application no. 201921050010, filed on Dec. 4, 2019.

TECHNICAL FIELD

The disclosure herein generally relates to the field of tool industry, and, more particularly, to a method and system for recommending tool configurations in machining.

BACKGROUND

In a tool industry, selecting the best tool configuration for machining operations is very important because it will provide better performance and longer tool life which leads to better productivity and quality of machining. Currently, a domain expert selects possible tool configurations for a given customer requirement based on heuristic knowledge coming from experience. Further, for the selected possible tool configurations, extensive experimental trials need to be carried out. As the physics of the machining operations are complex, it is difficult to model the process of selecting tool configurations based on its physics.

Prior methods for tool configuration selection discusses a rule and knowledge-based system to select cutting tools during machining process planning. These methods primarily use the experience and technical expertise of engineers, and past case selections to build the database and rules. These methods obtain tool configurations for a given application and workpiece geometry only. Further these methods do not recommend tool configuration which satisfy customer requirements. There are no reliable models available which recommends an appropriate tool configuration for a new requirement.

SUMMARY

Embodiments of the present disclosure t technological improvements as solutions to one or more of the above-mentioned technical problems recognized by the inventors in conventional systems. For example, in one embodiment, a method for recommending tool configuration in machining is provided.

In an aspect, there is provided a processor implemented method for recommending tool configurations in machining. The method comprises: receiving customer requirement data as input for recommending a set of tool configurations in machining wherein each tool configuration of the set of tool configurations comprises a set of tool configuration parameters; extracting a set of model input parameters from the customer requirement data based on a predefined machining process; obtaining a probability score for each tool configuration parameter of the set of tool configuration parameters from the set of model input parameters using a hierarchical model wherein the hierarchical model is pre-trained; determining a joint probability for each tool configuration of the set of tool configurations using the probability score for each tool configuration parameter; and recommending a predefined number of tool configurations out of the set of tool configurations based on a predefined criterion of the joint probability of each tool configuration.

In another aspect, there is provided a system for recommending tool configurations in machining. The system comprises: receive customer requirement data as input for recommending a set of tool configurations in machining wherein each tool configuration of the set of tool configurations comprises a set of tool configuration parameters; extract a set of model input parameters from the customer requirement data based on a predefined machining process; obtain a probability score for each tool configuration parameter of the set of tool configuration parameters from the set of model input parameters using a hierarchical model wherein the hierarchical model is pre-trained; determine a joint probability for each tool configuration of the set of tool configurations using the probability score for each tool configuration parameter; and recommend a predefined number of tool configurations out of the set of tool configurations based on a predefined criterion of the joint probability of each tool configuration.

In an embodiment, the training of the hierarchical model comprises: receiving a set of past tool selection data as a first set of training data for training the hierarchical model; identifying a set of model parameters from the set of past tool selection data based on the predefined machining process wherein the set of model parameters comprises the set of model input parameters and the set of tool configurations; augmenting the first set of training data to obtain a second set of training data based on the number of first set of training data; and training the hierarchical model to predict each of the tool configuration parameters corresponding to the set of model input parameters using one of (i) the first set of training data or (ii) the second set of training data.

In an embodiment, the augmenting of the first set of training data is performed if the number of first set of training data is less than a predefined threshold wherein the predefined threshold is dependent on number of set of model parameters.

In an embodiment, the set of past tool selection data comprises past customer requirement data and corresponding selected tool configuration.

In an embodiment, the set of model input parameters comprises one or more of (i) work material parameters, (ii) machining parameters, (iii) quality requirement parameters, (iv) tool life requirement parameters, or (v) machining environment parameters.

In an embodiment, the tool configuration parameters comprise machining tool parameters.

In an embodiment, the predefined criteria of the joint probability of each tool configuration is a highest joint probability defined by a domain expert.

In yet another aspect, there are provided one or more non-transitory machine readable information storage mediums comprising one or more instructions which when executed by one or more hardware processors causes at least one of: receiving customer requirement data as input for recommending a set of tool configurations in machining wherein each tool configuration of the set of tool configurations comprises a set of tool configuration parameters; extracting a set of model input parameters from the customer requirement data based on a predefined machining process; obtaining a probability score for each tool configuration parameter of the set of tool configuration parameters from the set of model input parameters using a hierarchical model wherein the hierarchical model is pre-trained; determining a joint probability for each tool configuration of the set of tool configurations using the probability score for each tool configuration parameter; and recommending a predefined number of tool configurations out of the set of tool configurations based on a predefined criterion of the joint probability of each tool configuration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
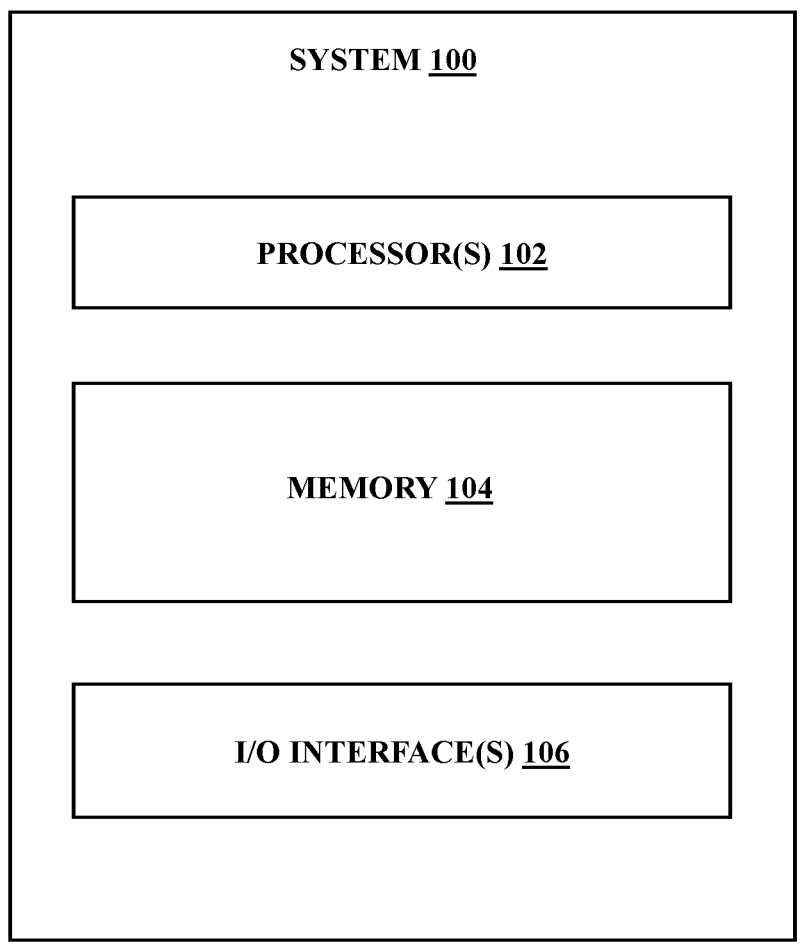
FIG. 1 illustrates an exemplary block diagram of a system for recommending tool configurations in machining, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Every machining process consists of a machine, a machining tool and the workpiece that is getting machined. The main challenge faced by a machining tool manufacturer, is to select a machining tool which will perform a given machining operation on the specified workpiece, under a set of machining parameters specified by the customer and satisfy the performance parameters. The machining tool selection involves the selection of several specification parameters concerning the material, geometry and composition of the machining tool. Prior methods for selection of tool configuration in machining considers a rule and knowledge-based approach. The experience and technical expertise of engineers are used in these methods for selection of tool configuration. In addition, the prior methods suggest tool configurations which are best for the application from a tool database.

The present disclosed method recommends tool configurations which were never used before i.e., new combinations of tool specification parameters are recommended using the embodiments of the present disclosure. The disclosed method uses machine learning approach along with a probabilistic model for recommending a top set of machining tool configuration. The disclosed method trains a hierarchical model, alternatively referred as model, from input data received from the customer for recommending appropriate tool configuration in machining. Further the method uses a probability model along with the trained hierarchical model for recommending top list of acceptable tool configurations with a probability score. The probability score for each predicted tool configuration gives an idea of how good the predicted tool configuration is, relative to the other tool configurations.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for recommending tool configurations in machining, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system for recommending tool configuration in machining may be stored in the memory 104.

Figure 2:
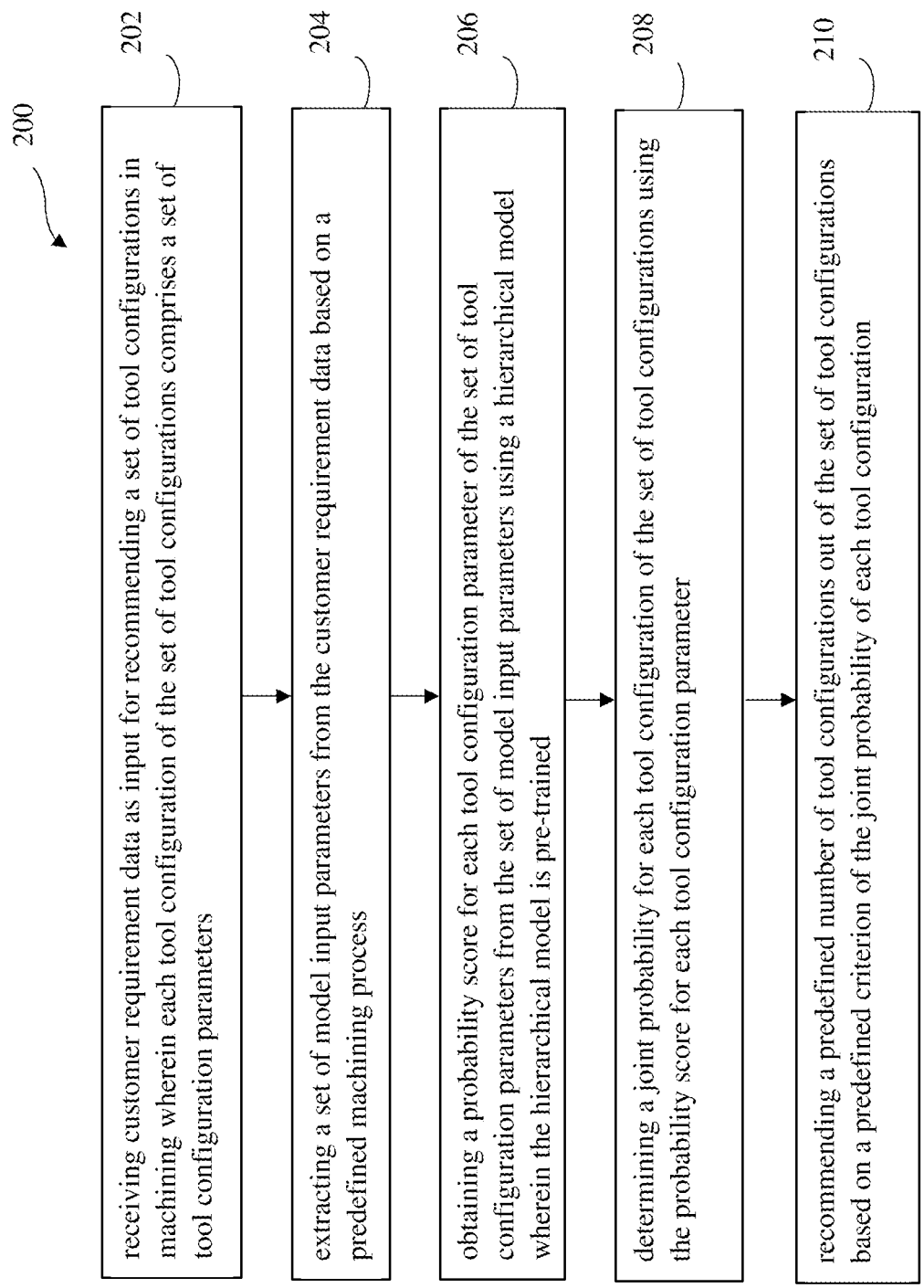
FIG. 2 is a flow diagram illustrating a method for recommending tool configurations in machining, in accordance with some embodiments of the present disclosure.

FIG. 2 is a flow diagram illustrating a method 200 for recommending tool configurations in machining, in accordance with some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The steps of the method 200 of the present disclosure will now be explained with reference to components of the system 100 of FIG. 1.

In an embodiment of the present disclosure, the one or more processors 102 are configured to receive at step 202, customer requirement data as input for recommending a set of tool configurations in machining wherein each tool configuration of the set of tool configurations comprises a set of tool configuration parameters. The tool configuration parameters comprise machining tool parameters. Considering tool configuration selection for an end milling process, the customer requirement data for this process may involve Material removal rate (MRR), workpiece material, workpiece hardness, type of operation, tool life, spindle speed range, feed rate range, workpiece dimensions, machine specifications and so on. Whereas considering tool configuration selection for cylindrical grinding process the customer requirement data for this process may involve MRR, workpiece material, workpiece hardness, surface roughness, cylindricity, dressing parameters, machine specifications, workpiece dimensions, grinding parameters and so on.

In an embodiment of the present disclosure, the one or more processors 102 are configured to extract at step 204, a set of model input parameters from the customer requirement data based on a predefined machining process. Generally, the model input parameters that are required to be considered for the selection of a machining tool are workpiece parameters, machining parameters and performance parameters. Specifically, the set of model input parameters comprises one or more of work material parameters, machining parameters, quality requirement parameters, tool life requirement parameters or machining environment parameters. Workpiece parameters may involve workpiece geometry parameters, workpiece material and material hardness. Machining parameters may involve spindle speed, feed rate and depth of cut. Spindle speed is a characteristic of the machining process. Performance parameters involve finished workpiece quality parameters and machining tool life. Finished workpiece quality parameters mainly involve dimensional accuracy and surface finish. The relative importance of the model input parameters will depend on the specific machining process considered. The model input parameters for tool configuration selection process are selected as per relevance in the machining process. Machining environment parameters such as coolant parameters need not be considered as these parameters remains uniform during a given machining process and are not varied for different cutting tools.

Figure 3:
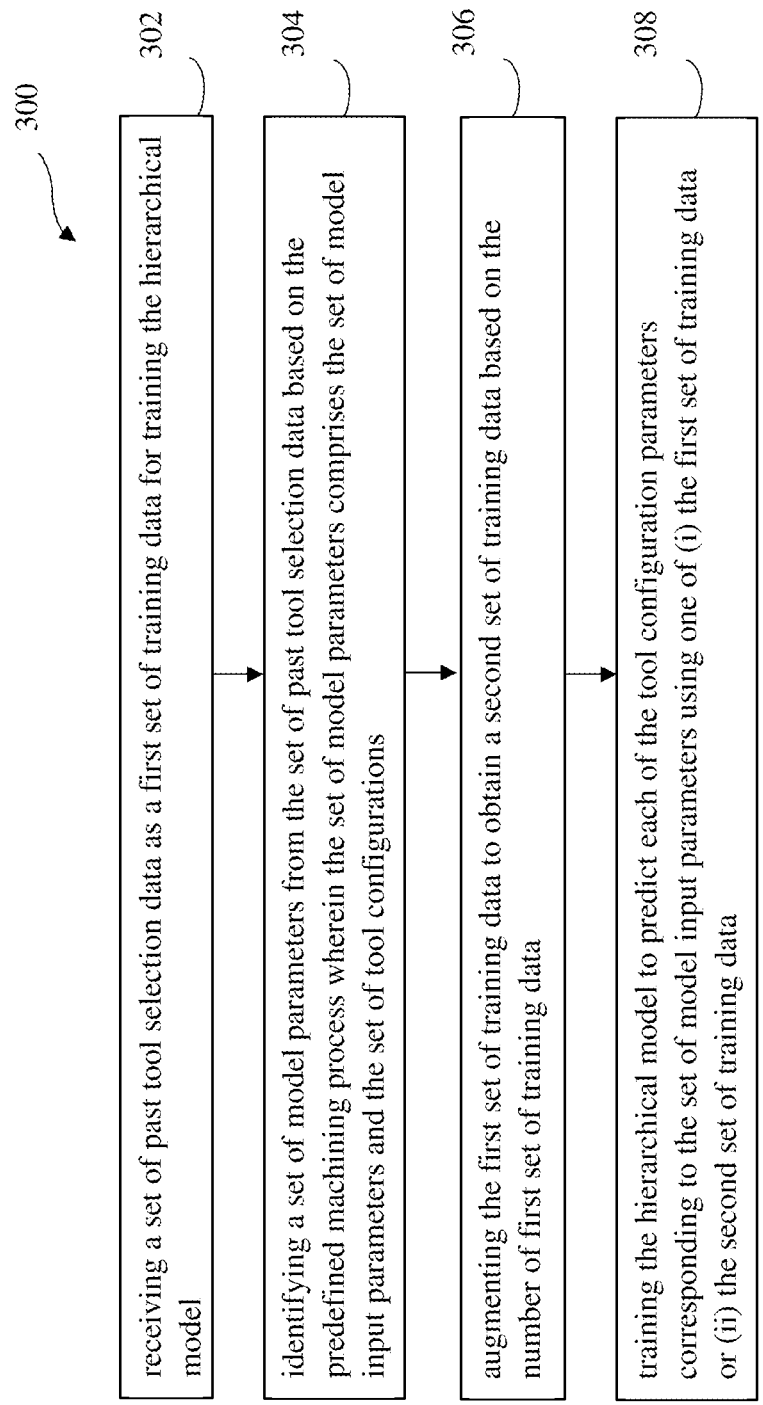
FIG. 3 is a flow diagram illustrating steps involved in training of a hierarchical model for recommending tool configurations in machining, in accordance with some embodiments of the present disclosure.

In an embodiment of the present disclosure, the one or more processors 102 are configured to obtain at step 206 a probability score for each tool configuration parameter of the set of tool configuration parameters from the set of model input parameters using a hierarchical model wherein the hierarchical model is pre-trained. The training of the hierarchical model is explained in conjunction with FIG. 3. FIG. 3 is a flow diagram illustrating steps involved in training of the hierarchical model for recommending tool configurations in machining, in accordance with some embodiments of the present disclosure.

In an embodiment the training of the hierarchical model is explained using the steps in the flow diagram 300. The training of hierarchical model comprises at step 302 receiving a set of past tool selection data as a first set of training data for training the hierarchical model. The set of past tool selection data comprises past customer requirement data and corresponding selected tool configuration.

In an embodiment at step 304 the training of the hierarchical model comprises identifying a set of model parameters from the set of past tool selection data based on the predefined machining process wherein the set of model parameters comprises the set of model input parameters and the set of tool configurations. The predefined machining process may be cylindrical grinding wheel process, turning process, end milling process and so on. The set of model parameters are identified in accordance with the machining process considered by the domain expert.

In an embodiment at step 306 the training of the hierarchical model comprises augmenting the first set of training data to obtain a second set of training data based on the number of first set of training data. The augmenting of the first set of training data is performed if the number of first set of training data is less than a predefined threshold. The system 100 is configured to check whether enough first set of training data received is available for training the hierarchical model. If the number of first set of training data is above a predefined threshold value augmentation is not performed. The predefined threshold depends on the number of input and output parameters (the set of model parameters) of the hierarchical model and the performance of the model. For example, in the cylindrical grinding wheel process, the threshold was set at 2000. The received first set of training data is augmented for training the hierarchical model. An augmentation data can be created by varying some of the parameters from the received first set of training data. The first set of training data comprises of continuous and discrete parameters. The continuous parameters are augmented using any standard augmentation technique such as SMOTE (Synthetic Minority Over-sampling Technique), SMOTE-NC (Nominal and Continuous) and so on, which is selected by the domain expert. For example, for grinding wheel selection for cylindrical grinding process, the continuous parameters MRR, grinding ratio and surface roughness are augmented for training the hierarchical model.

In an embodiment at step 308 the training of the hierarchical model comprises training the hierarchical model to predict each of the tool configuration parameters corresponding to the set of model input parameters using one of (i) the first set of training data or (ii) the second set of training data. Once the data for training the hierarchical model is obtained to the required level either directly from the received past set of tool selection data or via the augmentation process, the hierarchical model is built for predicting the acceptable tool configurations. The model is built considering the inter relationships between different tool configuration parameters and selection sequence of these parameters, which is provided by the domain expert. The selection hierarchy involved in a machining tool selection problem is stated below.

Material selection: Machining is a process where a harder material tool is used to machine a softer material workpiece. Therefore, the material of the machining tool is selected first considering the customer requirement. Machining tools are generally composed of multiple materials. The conventional machining tools available today are mostly coated tools, where a coating material is applied over the base material to improve the tool properties. The base materials and coating materials should be chemically compatible with each other. In the case of finishing process such as grinding, the cylindrical grinding wheel is composed of an abrasive and a bonding material. They also have chemical compatibility issues. Therefore, the selection of machining tool materials will follow a hierarchy, where the base material/abrasive material is selected first, and the coating material/bonding material is selected next depending on the previous selection. This will depend upon the machining process considered and the type of tool selected.

Machining tool parameter selection: Once the materials are selected, the machining tool parameters are selected independently considering the previous selection. These parameters involve tool geometry parameters and tool auxiliary parameters. In turning process, the tool geometry parameters are cutting edge angles, nose radius, etc. In a cylindrical grinding wheel process, the tool geometry parameter is abrasive grit size. Auxiliary tool parameters in a cylindrical grinding wheel process are wheel grade and wheel structure. The auxiliary tool parameters are dependent on the specific tool and application.

The model is built over a past tool configuration selection data. Considering the example of cylindrical grinding wheel process, suppose that the past data contains the following set of distinct tool configurations:

{(A1, B1, C1, D1, E1), (A1, B2, C1, D2, E2), (A1, B3, C1, D1, E3), (A2, B1, C3, D1, E1), (A1, B2, C1, D1, E2), (A2, B1, C2, D2, E1)} where A, B, C, D and E denote the grinding wheel specification parameters abrasive name, bond name, grit name, structure name and wheel grade respectively. (A1, A2), (B1, B2, B3), (C1, C2, C3), (D1, D2) and (E1, E2) are the classes of the respective specification parameters. By adopting a hierarchical model, the first specification parameter of the tool configuration will only have two distinct classes (A1 and A2). There are six distinct tool configurations being considered.

The hierarchical model is trained, and hyper parameter tuning is performed for obtaining standard performance in terms of accuracy. A first model is trained to predict the first tool configuration parameter. This will help the model to learn insights from the data more easily as the number of different classes have been decreased from six to two in the example of cylindrical grinding wheel process. A second model is trained to predict the second tool configuration parameter. The second model is trained by feeding the input data of the first model input parameters and the predicted class of the first model. Similarly, the rest of the models are trained as per the hierarchy. The trained model provides probability score for each tool parameter from the received model input parameters.

During the training of the hierarchical model it is checked whether an optimum performance has been achieved for the trained hierarchical model. Checking is performed based on accuracy metrics. If greater than 90% of the predictions are correct, the training of the hierarchical learning model is stopped. Otherwise, hyper parameter optimization is performed to achieve better performance in terms of accuracy. The trained hierarchical model is stored in the database which is further used for recommendation of acceptable tool configuration. The number of models in the hierarchical model is dependent on the number of tool configuration parameters to be recommended in the machining process.

In an embodiment of the present disclosure, the one or more processors 102 are configured to determine at step 208 a joint probability for each tool configuration of the set of tool configurations using the probability score for each tool configuration parameter. Bayesian probability theorem along with conditional probability theorem is used for the prediction of top set of acceptable tool configurations for a given customer requirement. At each model of prediction, the best 'n' predictions are chosen based upon the probabilistic score distribution. For example, in the cylindrical grinding wheel process, the value 'n' has been chosen as three. The value 'n' is been chosen by the domain expert to reduce the time taken for recommending the top set of tool configurations. The joint probabilities for the combinations of the parameters are calculated using multi-event formula of conditional probability theorem and best predictions are chosen based upon their probabilistic scores. $P(B=B1|A=A1)$ is the probability of class 'B1' of specification parameter 'B', given that specification parameter A has the value A1. Considering the example of cylindrical grinding wheel process, the probability score can be determined using the equation (1) and (2).

$$P(B_{BondName=B1} \cap A_{AbrasiveName=A1}) = P(B_{Bondname=B1}|A_{AbrasiveName=A1}) * P(A_{Abrasivename=A1}) \qquad (1)$$

Similarly, the total probability for a specific tool configuration can be calculated. Suppose that the probability of a tool specification (A1, B2, C1, D2, E2) needs to be calculated.

$$P(A_1, B_2, C_1, D_2, E_2) = P(E_{WheelGradeName=E2}|D_{StructureName=D2} \cap B_{BondName=B2} \cap A_{AbrasiveName=A1} \cap C_{GritName=C1}) * P(D_{StructureName=D2}|B_{BondName=B2} \cap A_{AbrasiveName=A1} \cap C_{GritName=C1}) * P(C_{GritName=C1}|B_{BondName=B2} \cap A_{AbrasiveName=A1}) * P(B_{BondName=B2}|A_{AbrasiveName=A1}) * P(A_{AbrasiveName=A1}) \qquad (2)$$

Similarly, the probability for each tool configuration is calculated and compared to find out the top set of tool configurations applicable to the customer requirement.

In an embodiment of the present disclosure, the one or more processors 102 are configured to recommend at step 210 a predefined number of tool configurations out of the set of tool configurations based on a predefined criterion of the joint probability of each tool configuration. The predefined criteria of the joint probability of each tool configuration is a highest joint probability defined by the domain expert. The predefined number of tool configuration with highest probability is defined by the domain expert. For example, the top three tool configuration with highest probability is recommended in cylindrical grinding wheel process.

Figure 4:
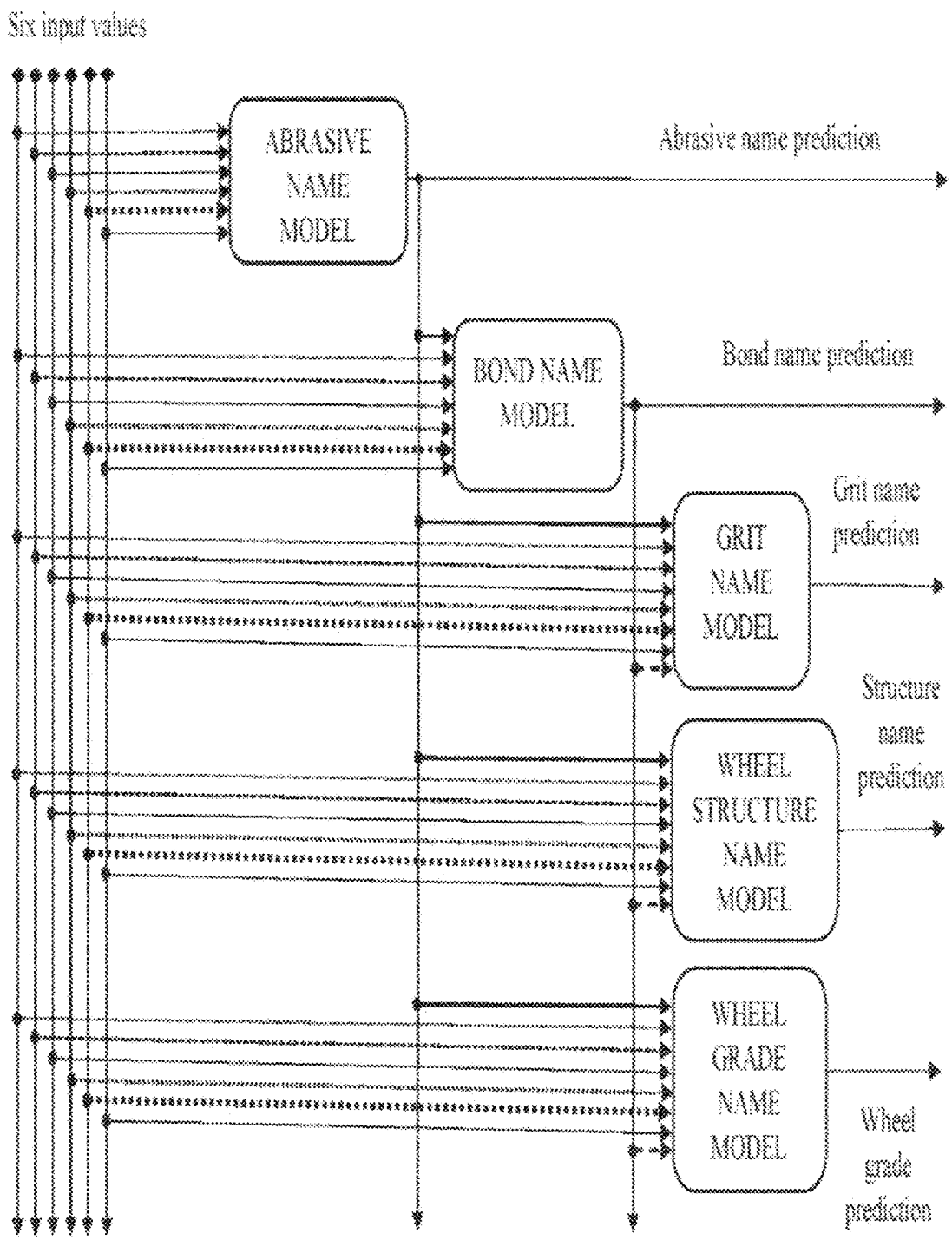
FIG. 4 illustrates an example of the hierarchical model for recommending grinding wheel specification parameters, in accordance with some embodiments of the present disclosure.

EXPERIMENTAL RESULTS: FIG. 4 illustrates an example of the hierarchical model for recommending grinding wheel specification parameter, in accordance with some embodiments of the present disclosure. The input values in the figure depicts the received customer requirement parameters such as material removal rate (MRR), work piece material type, work piece hardness, spindle speed, surface roughness and grinding ratio. Abrasive name model, Bond name model, Grit name model, Wheel structure name model and Wheel grade name model predicts the probability score for the tool specification parameters abrasive name, bond name, grit name, structure name and wheel grade respectively. There are six input variables given as input, which are extracted from the data provided by Client. The extracted input variables are wheel speed, work piece material, work piece hardness range, surface roughness, MRR and grinding ratio. The selection of wheel speed is dependent on the capability of the grinding machine. Model creation is done using semi deep neural network architecture. For each model a 5-layer neural network is trained and tested on augmented data. After training is done, the models are saved for future use, so that they can be called for predictions on new data points. The models are trained in the following manner. The input variables for the abrasive name model are wheel speed, work piece material, work piece hardness range, surface roughness, MRR, grinding ratio and the output variable is abrasive name. The input variables for the bond name model are wheel speed, work piece material, work piece hardness range, surface roughness, MRR, grinding ratio and abrasive name and the output variable is bond name. The input variables for the grit name model are wheel speed, work piece material, work piece hardness range, surface roughness, MRR, grinding ratio, abrasive name and bond name and the output variable is grit name. The input variables for the structure name model are wheel speed, work piece material, work piece hardness range, surface roughness, MRR, grinding ratio, abrasive name and bond name and the output variable is structure name. The input variables for the wheel grade model are wheel speed, work piece material, work piece hardness range, surface roughness, MRR, grinding ratio, abrasive name and bond name and the output variable is wheel grade. Model testing is performed on original dataset. The overall accuracy of the model for the original data is 92.40% for single best fit prediction.

The model input variables are extracted from the new customer requirement and provided to the hierarchical model for prediction. Each neural network model will provide the predictions of the categorical values of the respective wheel specification parameter with their probabilities. (For e.g.: The abrasive name model will predict the best categorical value of the abrasive name for the given customer requirement. The probabilities associated with all the categorical values of the parameter can be accessed.)

For the prediction of top five grinding wheel specifications, Bayes' Theorem for conditional probability distribution is used. At each stage of prediction, the top three predictions are chosen based upon the probabilistic distribution. The probabilities of individual predictions can be accessed from the output of individual models. Then, given the current prediction holds true, the best 3 predictions of the later stages are performed sequentially. Finally, the joint probability for the combination of these 5 parameters are calculated using total probability theorem and best 5 predictions are chosen based upon their probabilistic scores.

In the first step probability of abrasive name is calculated for all possible values of abrasive name. Given the value of 6 input parameters. Let $P(A_{abrasive\_name=a})$ IS probability of a particular abrasive name. Where 'a' is one of the possible values for abrasive name. Best three abrasive names are chosen and then prediction for bond name is done. Let $P(B_{bond\_name=b})$ is probability of a particular bond name. Where 'b' is one of the possible values for bond name.

$$P(B_{bond_{name}=b} \cap A_{abrasive_{name}=a}) = P(B_{bond_{name}=b} | A_{abrasive_{name}=a}) * P(A_{abrasive_{name}=a}) \quad (3)$$

Same approach is used to calculate best five specifications based upon their probability scores. Probability scores for 243 combinations are identified and the top 5 predictions are selected from those based on probability scores. The overall performance increased further when best five prediction method was chosen. 100% overall accuracy for the wheel specification prediction was achieved. Every correct choice of wheel specification was present in best five prediction with a probabilistic Bayesian score.

The embodiments of present disclosure herein address the problem of recommendation of tool configurations in machining. The method provides a reliable model which leverages past tool configuration selection data and domain knowledge to recommend the top acceptable tool configuration in the specific domain. The method uses a hierarchical model which helps to deal with lesser amount of data and handles any number of configurations in a very effective manner. The probability model in the method helps to determine the best acceptable tool configuration using joint probability theorem.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for recommending tool configurations in machining (200) using a machine learning approach and a probability model, the method comprising:
   receiving, via one or more hardware processors, customer requirement data as input for recommending a set of tool configurations in machining, wherein customer requirement data for a cylindrical grinding wheel process includes material removal rate (MRR), workpiece material, workpiece hardness, surface roughness, cylindricity, dressing parameters, machine specifications, workpiece dimensions, and grinding parameters, wherein each tool configuration of the set of tool configurations comprises a set of tool configuration parameters (202), wherein the set of tool configuration parameters comprise machining tool parameters;
   extracting, via the one or more hardware processors, a set of model input parameters from the customer requirement data based on a predefined machining process (204) comprising one or more of the cylindrical grinding wheel process, a turning process, or an end milling process, wherein the set of model input parameters comprises one or more of (i) work material parameters including workpiece geometry parameters, workpiece material and material hardness, (ii) machining parameters including a spindle speed, a feed rate and a depth of cut, (iii) quality requirement parameters including a dimensional accuracy and a surface finish, (iv) tool life requirement parameters, or (v) machining environment parameters;
   obtaining, via the one or more hardware processors, a probability score for each tool configuration parameter of the set of tool configuration parameters from the set of model input parameters using a hierarchical model, wherein the hierarchical model is built considering inter relationships between tool configuration parameters and selection sequence of the tool configuration parameters and pre-trained (206) based on a sequence of selection of the set of tool configuration parameters and corresponds to a selection hierarchy of a material selection followed by a machining tool parameter selection,
   wherein training of the hierarchical model comprises:
   receiving a set of past tool selection data as a first set of training data for training the hierarchical model (302);
   identifying a set of model parameters from the set of past tool selection data based on the predefined machining process, wherein the set of model parameters comprises the set of model input parameters and the set of tool configurations (304);
   augmenting the first set of training data to obtain a second set of training data based on a number of the first set of training data (306), wherein an augmented data is created by varying parameters from the received first set of training data, wherein the first set of training data comprises continuous and discrete parameters, the continuous parameters are augmented using a Synthetic Minority Over-sampling Technique (SMOTE), SMOTE-NC (Nominal and Continuous); and
   training the hierarchical model to predict each of the tool configuration parameters corresponding to the set of model input parameters using one of (i) the first set of training data or (ii) the second set of training data (308), and along with the training, hyper parameter tuning is performed for obtaining performance in terms of accuracy, wherein a first model is trained to predict a first tool configuration parameter thereby the hierarchical model learns insights from the data with a decrease in a number of varied classes for the predefined machining process, and a second model is trained to predict a second tool configuration parameter,
   wherein the second model is trained by feeding an input data of the first model input parameters and a predicted class of the first model, wherein a number of models in the hierarchical model is dependent on a number of tool configuration parameters to be recommended in the predefined machining process;
   determining, via the one or more hardware processors, a joint probability for each tool configuration of the set of tool configurations using the probability score for each tool configuration parameter (208), wherein an abrasive name model, a bond name model, a Grit name model, a wheel structure name model and a wheel grade name model predicts the probability score for the tool specification parameters abrasive name, bond name, grit name, structure name and wheel grade, wherein model creation is performed using a semi deep neural network architecture wherein for each model a 5-layer neural network is trained and tested on the augmented data and after training, the models are saved for future use, so that they are called for predictions on new data points; and
   recommending, via the one or more hardware processors, a predefined number of tool configurations out of the set of tool configurations, that are new combinations of tool specification parameters, based on a predefined criterion of the joint probability of each tool configuration (210).

2. The processor implemented method as claimed in claim 1, wherein augmenting of the first set of training data is performed if the number of the first set of training data is less than a predefined threshold, wherein the predefined threshold is dependent on number of the set of model parameters.

3. The processor implemented method as claimed in claim 1, wherein a set of past tool selection data comprises past customer requirement data and corresponding selected tool configurations.

4. The processor implemented method as claimed in claim 1, wherein the predefined criteria of the joint probability of each tool configuration is a highest joint probability defined by a domain expert.

5. The processor implemented method as claimed in claim 1, wherein in the material selection, an abrasive material is selected first, followed by selecting a bonding material based on the selected abrasive material and depends on the predefined machining process considered and a type of tool selected,
   wherein the machining tool parameter selection includes tool geometry parameters and tool auxiliary parameters,
   wherein in the turning process, the tool geometry parameters are cutting edge angles, and a nose radius, wherein in the cylindrical grinding wheel process, the tool geometry parameter is abrasive grit size, wherein the tool auxiliary parameters in the cylindrical grinding wheel process are wheel grade and wheel structure, and the tool auxiliary parameters depend depends on a specific tool and an application.

6. A system (100), comprising:
a memory (104) storing instructions;
one or more communication interfaces (106); and
one or more hardware processors (102) coupled to the memory (104) via the one or more communication interfaces (106), wherein the one or more hardware processors (102) are configured by the instructions to:
receive customer requirement data as input for recommending a set of tool configurations in machining, wherein customer requirement data for a cylindrical grinding wheel process includes material removal rate (MRR), workpiece material, workpiece hardness, surface roughness, cylindricity, dressing parameters, machine specifications, workpiece dimensions, and grinding parameters, wherein each tool configuration of the set of tool configurations comprises a set of tool configuration parameters, wherein the set of tool configuration parameters comprise machining tool parameters;
extract a set of model input parameters from the customer requirement data based on a predefined machining process comprising one or more of the cylindrical grinding wheel process, a turning process, or an end milling process, wherein the set of model input parameters comprises one or more of (i) work material parameters including workpiece geometry parameters, workpiece material and material hardness, (ii) machining parameters including a spindle speed, a feed rate and a depth of cut, (iii) quality requirement parameters including a dimensional accuracy and a surface finish, (iv) tool life requirement parameters, or (v) machining environment parameters;
obtain a probability score for each tool configuration parameter of the set of tool configuration parameters from the set of model input parameters using a hierarchical model, wherein the hierarchical model is built considering inter relationships between tool configuration parameters and selection sequence of the tool configuration parameters and pre-trained based on a sequence of selection of the set of tool configuration parameters and corresponds to a selection hierarchy of a material selection followed by a machining tool parameter selection,
wherein training of the hierarchical model comprises:
receiving a set of past tool selection data as a first set of training data for training the hierarchical model;
identifying a set of model parameters from the set of past tool selection data based on the predefined machining process, wherein the set of model parameters comprises the set of model input parameters and the set of tool configurations;
augmenting the first set of training data to obtain a second set of training data based on a number of the first set of training data, wherein an augmented data is created by varying parameters from the received first set of training data, wherein the first set of training data comprises continuous and discrete parameters, the continuous parameters are augmented using a Synthetic Minority Over-sampling Technique (SMOTE), SMOTE-NC (Nominal and Continuous); and training the hierarchical model to predict each of the tool configuration parameters corresponding to the set of model input parameters using one of (i) the first set of training data or (ii) the second set of training data (308), and along with the training, hyper parameter tuning is performed for obtaining performance in terms of accuracy,
wherein a first model is trained to predict a first tool configuration parameter thereby the hierarchical model learns insights from the data with a decrease in a number of varied classes for the predefined machining process, and a second model is trained to predict a second tool configuration parameter,
wherein the second model is trained by feeding an input data of the first model input parameters and a predicted class of the first model, wherein a number of models in the hierarchical model is dependent on a number of tool configuration parameters to be recommended in the predefined machining process;
determine a joint probability for each tool configuration of the set of tool configurations using the probability score for each tool configuration parameter, wherein an abrasive name model, a bond name model, a Grit name model, a wheel structure name model and a wheel grade name model predicts the probability score for the tool specification parameters abrasive name, bond name, grit name, structure name and wheel grade, wherein model creation is performed using a semi deep neural network architecture wherein for each model a 5-layer neural network is trained and tested on the augmented data and after training, the models are saved for future use, so that they are called for predictions on new data points; and
recommend a predefined number of tool configurations out of the set of tool configurations, that are new combinations of tool specification parameters, based on a predefined criterion of the joint probability of each tool configuration.

7. The system as claimed in claim 6, wherein augmenting of the first set of training data is performed if the number of the first set of training data is less than a predefined threshold wherein the predefined threshold is dependent on number of set of model parameters.

8. The system as claimed in claim 6, wherein a set of past tool selection data comprises past customer requirement data and corresponding selected tool configurations.

9. The system of claim 6, wherein the predefined criteria of the joint probability of each tool configuration is a highest joint probability defined by a domain expert.

10. The system as claimed in claim 6, wherein in the material selection, an abrasive material is selected first, followed by selecting a bonding material based on the selected abrasive material and depends on the predefined machining process considered and a type of tool selected,
wherein the machining tool parameter selection includes tool geometry parameters and tool auxiliary parameters,
wherein in the turning process, the tool geometry parameters are cutting edge angles, and a nose radius, wherein in the cylindrical grinding wheel process, the tool geometry parameter is abrasive grit size,
wherein the tool auxiliary parameters in the cylindrical grinding wheel process are wheel grade and wheel structure, and the tool auxiliary parameters depend depends on a specific tool and an application.

11. One or more non-transitory machine readable information storage media comprising one or more instructions, which when executed by one or more hardware processors causes a method for:

receiving customer requirement data as input for recommending a set of tool configurations in machining, wherein customer requirement data for a cylindrical grinding wheel process includes material removal rate (MRR), workpiece material, workpiece hardness, surface roughness, cylindricity, dressing parameters, machine specifications, workpiece dimensions, and grinding parameters, wherein each tool configuration of the set of tool configurations comprises a set of tool configuration parameters, wherein the set of tool configuration parameters comprise machining tool parameters;

extracting a set of model input parameters from the customer requirement data based on a predefined machining process comprising one or more of the cylindrical grinding wheel process, a turning process, or an end milling process, wherein the set of model input parameters comprises one or more of (i) work material parameters including workpiece geometry parameters, workpiece material and material hardness, (ii) machining parameters including a spindle speed, a feed rate and a depth of cut, (iii) quality requirement parameters including a dimensional accuracy and a surface finish, (iv) tool life requirement parameters, or (v) machining environment parameters;

obtaining a probability score for each tool configuration parameter of the set of tool configuration parameters from the set of model input parameters using a hierarchical model, wherein the hierarchical model built considering inter relationships between tool configuration parameters and selection sequence of the tool configuration parameters and is pre-trained based on a sequence of selection of the set of tool configuration parameters and corresponds to a selection hierarchy of a material selection followed by a machining tool parameter selection, wherein training of the hierarchical model comprises:

receiving a set of past tool selection data as a first set of training data for training the hierarchical model;

identifying a set of model parameters from the set of past tool selection data based on the predefined machining process, wherein the set of model parameters comprises the set of model input parameters and the set of tool configurations;

augmenting the first set of training data to obtain a second set of training data based on a number of the first set of training data (306), wherein an augmented data is created by varying parameters from the received first set of training data, wherein the first set of training data comprises continuous and discrete parameters, the continuous parameters are augmented using a Synthetic Minority Oversampling Technique (SMOTE), SMOTE-NC (Nominal and Continuous); and training the hierarchical model to predict each of the tool configuration parameters corresponding to the set of model input parameters using one of (i) the first set of training data or (ii) the second set of training data (308), and along with the training, hyper parameter tuning is performed for obtaining performance in terms of accuracy, wherein a first model is trained to predict a first tool configuration parameter thereby the hierarchical model learns insights from the data with a decrease in a number of varied classes for the predefined machining process, and a second model is trained to predict a second tool configuration parameter, wherein the second model is trained by feeding an input data of the first model input parameters and a predicted class of the first model, wherein a number of models in the hierarchical model is dependent on a number of tool configuration parameters to be recommended in the predefined machining process;

determining a joint probability for each tool configuration of the set of tool configurations using the probability score for each tool configuration parameter, wherein an abrasive name model, a bond name model, a Grit name model, a wheel structure name model and a wheel grade name model predicts the probability score for the tool specification parameters abrasive name, bond name, grit name, structure name and wheel grade, wherein model creation is performed using a semi deep neural network architecture wherein for each model a 5-layer neural network is trained and tested on the augmented data and after training, the models are saved for future use, so that they are called for predictions on new data points; and recommending a predefined number of tool configurations out of the set of tool configurations, that are new combinations of tool specification parameters, based on a predefined criterion of the joint probability of each tool configuration.

* * * * *